United States Patent
Kong

(10) Patent No.: US 11,486,963 B2
(45) Date of Patent: Nov. 1, 2022

(54) MULTIPLE INPUT MULTIPLE OUTPUT (MIMO) TARGET EMULATION SYSTEM AND METHOD FOR TESTING MMWAVE RADAR SENSOR

(71) Applicant: Keysight Technologies, Inc., Santa Rosa, CA (US)

(72) Inventor: Hong-Wei Kong, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 177 days.

(21) Appl. No.: 16/944,277

(22) Filed: Jul. 31, 2020

(65) Prior Publication Data

US 2021/0055382 A1 Feb. 25, 2021

(51) Int. Cl.
*G01S 7/40* (2006.01)
*G01S 13/00* (2006.01)

(52) U.S. Cl.
CPC .......... *G01S 7/4052* (2013.01); *G01S 13/003* (2013.01); *G01S 7/4082* (2021.05)

(58) Field of Classification Search
CPC ...... G01S 13/003; G01S 13/42; G01S 7/4052; G01S 7/4082
See application file for complete search history.

(56) References Cited

U.S. PATENT DOCUMENTS

2006/0244654 A1* 11/2006 Cheng .................. G01S 7/4056
342/165
2017/0363719 A1* 12/2017 Ahmed ................. G01S 7/4052

2019/0190624 A1* 6/2019 Kyosti ................. H04B 7/0413
2020/0184027 A1* 6/2020 Dolan .................... G01S 13/931

FOREIGN PATENT DOCUMENTS

| CN | 107831479 A | 3/2018 |
| CN | 108802702 A | 11/2018 |
| EP | 3260876 A1 | 12/2017 |

OTHER PUBLICATIONS

English Translation of CN107831479A.
English Translation of CN108802702A.

* cited by examiner

*Primary Examiner* — Timothy X Pham

(57) ABSTRACT

A MIMO target emulation system for testing a mmWave radar sensor having multiple radar transmitters and receivers includes a coupling probe antenna array for receiving radar signals from the radar transmitters and for sending emulated target echo signals to the radar receivers; emulator receivers for down converting and digitizing the radar signals; a processing unit that decouples the digital radar signals, retrieves target parameters corresponding to emulated targets, generates emulated target echo signals corresponding to the targets in response to the decoupled digitized radar signals using the target parameters, and pre-decoupling the emulated target echo signals; and emulator transmitters for performing digital to analog conversion of the emulated target echo signals and up converting frequencies of the analog emulated target echo signals. The emulator transmitters simultaneously send the analog emulated echo target signals to the radar sensor via the antenna array to emulate target echoes responsive to the radar signals.

20 Claims, 2 Drawing Sheets

MULTIPLE INPUT MULTIPLE OUTPUT (MIMO) TARGET EMULATION SYSTEM AND METHOD FOR TESTING MMWAVE RADAR SENSOR

CROSS-REFERENCE TO PRIOR APPLICATION

The present application claims priority under 35 U.S.C. § 119 to Chinese Patent Application No. 201910769553.6, filed on Aug. 20, 2019, which is hereby specifically incorporated by reference in its entirety.

BACKGROUND

Millimeter wave (mmWave) automotive radar is a key technology for advanced driver-assistance systems (ADAS) and for planned autonomous driving systems. Millimeter waves result from oscillations at frequencies in the frequency spectrum between 30 gigahertz (GHz) and 300 GHz. For example, millimeter wave automotive radar is used in ADAS to warn of forward collisions and backward collisions, to implement adaptive cruise control and autonomous parking, and ultimately to perform autonomous driving on streets and highways. Millimeter wave automotive radar has advantages over other sensor systems in that millimeter wave automotive radar can work under most types of weather and in light and darkness. Adaptation of millimeter wave automotive radar has lowered costs to the point that mmWave automotive radar can now be deployed in large volumes. Thus, mmWave automotive radar is now widely used for long range, middle range and short range environment sensing in ADAS. Additionally, millimeter wave automotive radar systems are likely to be widely used in autonomous driving systems currently being developed.

Conventional automotive mmWave radar systems typically have multiple radio frequency (RF) transmitters and multiple RF receivers, where the RF transmitters may be used either to improve spatial resolution of the radar or to achieve transmitter beam sweeping. Actual driving environments in which automotive radars may be deployed can vary greatly and many such driving environments may be complex. For example, actual driving environments may contain numerous objects, and some objects encountered in actual driving environments have complicated reflection, diffraction and multi-time reflection characteristics that affect echo signals. The immediate consequences of incorrectly sensing and/or interpreting echo signals may be that false warnings or improper reactions are triggered or warnings or reactions that should be triggered are not, which in turn can lead to collisions.

In recent years, developers testing autonomous vehicles in actual driving environments have reported a series of accidents, showing the importance of thorough testing for automotive radar and on-vehicle driving controllers. To avoid such accidents, automotive radars may be tested in various driving scenarios. A testing environment for automotive radars may include a scenario emulator which emulates echo signals from multiple objects or targets (multi-target echo signals) to the different radar sensors on a vehicle under the driving scenarios. The different radar sensors are tested using the emulated echo signals. However, use of scenario emulators has imposed challenges in designing test solutions. For example, to emulate the different scenarios, software capable of emulating the echo signals from multiple targets is required, including scenarios in which the automobile is moving. Additionally, the hardware setup must be capable of replaying the echo signals. Considering that the echo signals need to be dynamically emulated from various domains for each radar sensor, including a power domain, a time domain, a Doppler frequency domain and a spatial domain, it is difficult to design a testing environment with required flexibility and scalability. Additionally, data from multiple radar sensors, e.g., for covering long, middle and short range sensing and different sides of the vehicle, are fused to aid the environment sensing. The scenario emulator thus needs to emulate the echo signals for the multiple radar sensors simultaneously and synchronously.

One conventional approach is a single input single output (SISO)/single input multiple output (SIMO) automotive radar target emulator based on the analog technology. The analog technology, such as delayed line, is used to emulate the target echo signals with different delays, frequency shift and amplitude, for example. Due to the cost of the analog technology, this SISO/SIMO radar target emulator typically has limited capabilities with respect to emulating multiple targets. To emulate spatial characteristics of target echo signals, physical spatial emulation is used, and one target echo signal from one direction typically will require one channel radar target emulator output. Multi-target emulation using this approach therefore does not scale well when the number of targets is large, which is typically the case for driving scenarios.

Another conventional approach is a SISO/SIMO automotive radar target emulator based on the digital technology. With this approach, the radar target emulator may emulate a larger number of targets; however, the radar target emulator uses physical spatial emulation to emulate the target spatial characteristics. Thus, different targets with different angles of arrival require different output channels of the channel emulator. Also, for the digital radar target emulator, one target echo signal from one direction typically will require one channel of the radar target emulator output. Therefore, this solution thus does not scale well when there are many targets with many different angles of arrivals.

These conventional solutions do not adequately meet the requirements for highly dynamic scenarios of modern test environments. For example, the SISO/SIMO radar target emulators do not effectively emulate scenarios in which the radar or sensor transmitters are using beamforming technology or multiple input multiple output (MIMO) technology. When the radar transmitter performs beam sweeping, for example, different parts of the drive scenario are illuminated dynamically, resulting in significant changes in target echo signals. With a single input, it is not known which part of the drive scenario is being illuminated, and thus the target echo signals cannot be accurately emulated. Also, when multiple radar signals are involved, the SISO/SIMO radar target emulator's single input combines the multiple signals from the different radar transmitters. These combined signals cannot be separated, and thus the corresponding target echo signals cannot be emulated correctly.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
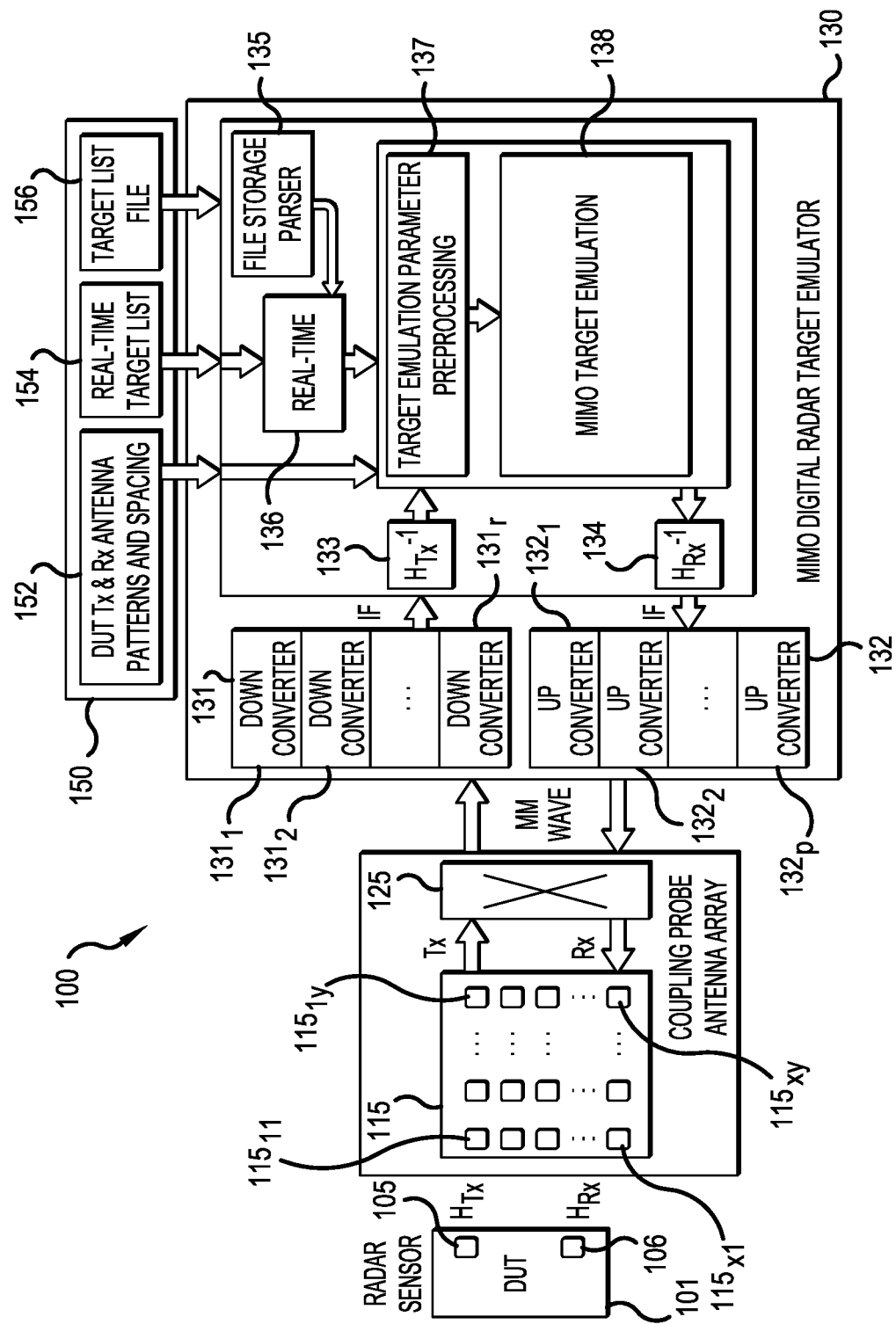
FIG. 1 is a simplified block diagram showing a multiple input multiple output (MIMO) radar target emulation system for testing a mmWave radar sensor using dynamic echo signal emulation, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, a cost effective, scalable, multi-target dynamic echo signal emulation system and method are provided for testing and evaluating automotive radar with multiple radar transmitters using emulated radar targets provided by a MIMO radar target emulator. Multiple dynamic radar echo signals may be emulated with different angles of arrival without using physical spatial emulation. Different radar signals are transmitted on the different radar transmitters of the automotive radar or radar sensor (the DUT). The embodiments are scalable to the number of target echo signals with no limitation on parameters of the target echo signals, thus emulation of relatively complex drive scenarios may be supported. The embodiments are also cost effective. For example, the number of emulator transmitters of the MIMO radar target emulation system being used is the same as the number of radar transmitters of the radar sensor, but is independent of the number of target echo signals to be emulated, enabling the number of emulated radar targets to exceed the number of emulator transmitters (and radar transmitters). Likewise, the number of emulator receivers of the MIMO radar target emulation system is equal to the number of radar transmitters of the radar sensor, and the number of emulator transmitters of the MIMO radar target emulation system is equal to the number of the radar receivers of the radar sensor, while the number of radar targets that can be emulated is independent of the hardware setup. Also, a standard interface enables emulation of target echo signals in different drive scenarios. Thus, the various embodiments address the cost scalability of emulating dynamic multiple radar targets with different angles of arrival and for radar sensors with beamforming or MIMO radar, for example.

Thus, according to an aspect of the present disclosure, a MIMO target emulation system is provided for testing a mmWave radar sensor having multiple radar transmitters for transmitting radar signals, and multiple radar receivers for receiving target echo signals responsive to the transmitted radar signals reflected from radar targets. The MIMO target emulation system includes an antenna array, multiple emulator receivers, multiple emulator transmitters, and a processing unit. The antenna array includes multiple coupling probe antenna elements for receiving the radar signals transmitted by the radar transmitters and for sending emulated target echo signals to the radar receivers. The emulator receivers include down converters for down converting carrier frequencies of the radar signals received by the antenna array and analog to digital converters for digitizing the down converted radar signals, respectively, to provide digital radar signals. The processing unit includes a processor and a memory for computer readable code that, when executed by the processor, causes the processor to decouple the digital radar signals; to retrieve target parameters generated by a scenario simulator, the target parameters corresponding to emulated radar targets for reflecting the radar signals transmitted by the radar transmitters; to generate emulated target echo signals, corresponding to the emulated radar targets, in response to the decoupled digitized radar signals, respectively, based at least in part on the target parameters of each of the emulated radar targets; and to pre-decouple the emulated target echo signals. The emulator transmitters including digital to analog converters for performing digital to analog conversion of the emulated target echo signals to provide analog emulated target echo signals and up converters for up converting frequencies of the analog emulated target echo signals, respectively. The emulator transmitters simultaneously send the analog emulated echo target signals to the mmWave radar sensor via the antenna array to simulate echoes from the emulated targets responsive to the radar signals, respectively. Performance of the mmWave radar sensor is determined based at least in part on the emulated echo target signals from the emulated targets.

The number of the emulator receivers may be equal to the number of radar transmitters of the mmWave radar sensor, and the number of the emulator transmitters may be equal to the number of radar receivers of the mmWave radar sensor. Also, the computer executable code may further cause the processing unit to retrieve transmit antenna patterns and spacing corresponding to the radar transmitters of the mmWave radar sensor, respectively; and to retrieve receive antenna patterns and spacing corresponding to the radar receivers of the mmWave radar sensor, respectively. Providing the emulated target echo signals, corresponding to the emulated targets, may be further based on the transmit antenna patterns and spacing and on the receive antenna patterns and spacing.

FIG. 1 is a simplified block diagram showing a MIMO radar target emulation system for testing a mmWave radar sensor using dynamic echo signal emulation, according to a representative embodiment.

Referring to FIG. 1, the radar target emulation system 100 includes antenna system 110, digital MIMO target emulator 130, and memory 150. The antenna system 110 includes coupling probe antenna array 115 and multiplexer 125. The coupling probe antenna array 115 includes an array of probe antenna array elements $115_{11}$ to $115_{xy}$ (where x and y are positive integers). The coupling probe antenna array 115 receives radar signals from transmit antennas (not shown) of a DUT 101, and together with the transmit antennas forms a transmit coupling matrix $H_{Tx}$. The coupling probe antenna array 115 also receives emulated target echo signals from the MIMO target emulator 130, and together with receive antennas (not shown) of the DUT 101, sends the emulated target echo signals to the receive antennas of the DUT 101 in the form of a receive coupling matrix $H_{Rx}$. More particularly, the DUT 101 includes a mmWave radar sensor, e.g., for automotive radar, that transmits radar signals from multiple radar transmitters 105 (indicated by a single representative radar transmitter for the sake of illustration), and that receives emulated target echo signals from the MIMO target emulator 130 responsive to the transmitted radar signals at multiple radar receivers 106 (indicated by a single representative radar receiver for the sake of illustration). In an embodiment, the coupling probe antenna array 115 is reconfigurable, meaning that the probe antenna array elements $115_{11}$ to $115_{xy}$ may be placed at the different locations of the coupling probe antenna array 115, or the probe antenna array elements $115_{11}$ to $115_{xy}$ may be fixed and switches (not shown) are provided to selectively connect the MIMO target emulator 130 to the coupling probe antenna array 115, where the connections may be dynamically reconfigured, e.g., by operation of the switches.

The MIMO target emulator 130 includes multiple emulator receivers $131_1$, $131_2$ ... $131_p$ (where p is a positive integer) and multiple emulator transmitters $132_1$, $132_2$ ... $132_r$ (where r is a positive integer, which may be different from or the same as p). Each of the emulator receivers $131_1$, $131_2$ ... $131_p$ includes a down converter for down converting the mmWave carrier frequencies of the radar signals provided by the coupling probe antenna array 115 via the multiplexer 125 to an intermediate frequency (IF), and an analog to digital converter (ADC) for digitizing the down converted radar signals, respectively, to provide digital radar signals. The number of emulator receivers $131_1$, $131_2$ ... $131_p$ (or down converters) may equal to the number of radar transmitters 105 in the DUT 101. The emulator receivers $131_1$, $131_2$ ... $131_p$ are tuned to receive different mmWave carrier frequencies corresponding to the radar transmitters 105, respectively. Each of the emulator transmitters $132_1$, $132_2$ ... $132_r$ may include a digital to analog converter (DAC) for performing digital to analog conversion of the emulated target echo signals, output by the MIMO target emulator 130, to provide analog emulated target echo signals, and an up converter for up converting IFs of the analog emulated target echo signals to mmWave carrier frequencies. The number of emulator transmitters $132_1$, $132_2$ ... $132_r$ (or up converters) may equal to the number of radar receivers 106 in the DUT 101. The emulator transmitters $132_1$, $132_2$ ... $132_r$ are tuned to transmit the emulated target echo signals at different mmWave carrier frequencies corresponding to the radar receivers 106, respectively.

Thus, the coupling probe antenna array 115 couples the radar signals from the radar transmitters 105 in the DUT 101 to the emulator receivers $131_1$, $131_2$ ... $131_p$, and couples the emulated target echo signals from the emulator transmitters $132_1$, $132_2$ ... $132_r$ to the radar receivers 106 in the DUT 101. By controlling switches (not shown) for selectively connecting the probe antenna array elements $115_{11}$ to $115_{xy}$ and RF connectors (not shown) of the MIMO target emulator 130, the set of probe antenna array elements $115_{11}$ to $115_{xy}$ that can achieve the transmit coupling matrix $H_{Tx}$ with the lowest condition number may be selected to assure that the transmit coupling matrix $H_{Tx}$ is well conditioned and can be decoupled by the decoupling module 133, discussed below. In an embodiment, all or part of the coupling probe antenna array 115 may be integrated with the emulator receivers $131_1$, $131_2$ ... $131_p$ and/or the emulator transmitters $132_1$, $132_2$ ... $132_r$.

The memory 150 of the radar target emulation system 100 includes an antenna pattern and spacing database 152, a real-time target list database 154, and a target list file database 156. Although each of the antenna pattern and spacing database 152, the real-time target list database 154, and the target list file database 156 is shown as a single illustrative block, it is understood that each may be implemented by one or more memories and/or databases, or all may be implemented by a single memory/database, without departing from the scope of the present teachings. For example, the memory 150 may be implemented using one or more non-transitory computer readable mediums. The memory 150 may be implemented by any number, type and combination of random access memory (RAM) and read-only memory (ROM), for example, and may store various types of information, such as computer programs and software algorithms executable by the MIMO target emulator 130, discussed below, as well as data for antenna patterns/ spacing of the DUT 101 and drive scenarios, for example. The various types of ROM and RAM may include any number, type and combination of computer readable storage media, such as a disk drive, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of storage medium known in the art, which are tangible and non-transitory storage media (e.g., as compared to transitory propagating signals).

The antenna pattern and spacing database 152 stores the antenna pattern and antenna spacing of the transmit antennas (not shown) connected to the radar transmitters 105, and the antenna pattern and antenna spacing of the receive antennas (not shown) connected to the radar receivers 106. The transmit and receive antennas may be the same antennas or different sets of antennas for the DUT 101. When the transmit and receive antennas are the same, the antenna spacing would be the same, although the antenna patterns may differ. The antenna pattern and spacing database 152 is populated before performing the target echo signal emulation, e.g., by a scenario simulator, using measured data and/or simulated data sent from and to the DUT 101. For example, the antenna pattern may be determined by measuring the DUT 101 inside the test chamber (e.g., anechoic chamber) or may be based on a simulated antenna pattern.

The real-time target list database 154 and the target list file database 156 store data regarding parameters of the emulated radar targets, which simulate reflection of the radar signals from the DUT 101 to provide the emulated target echo signals. The target parameters may be produced by a scenario simulator (not shown) that provides a drive simulation scenario, and may include information such as locations and dimensions of the emulated radar targets, for example. The scenario simulator itself may be implemented using a scenario simulator processing unit, which may include one or more computer processors, digital signal processors (DSP), field-programmable gate arrays (FPGAs), application specific integrated circuits (ASICs), or combinations thereof, using any combination of hardware, software, firmware, hard-wired logic circuits, or combinations thereof. The scenario simulator may include its own memory (e.g., nonvolatile and volatile memory) for storing computer readable code that, when executed by the processing unit, models the drive simulation scenario, and generates the required data to interface with the MIMO target emulator 130. An example of scenario simulation software is Car-Maker, available from IPG Automotive, although any compatible scenario simulation software or code may be incorporated, without departing from the scope of the present teachings.

Thus, the real-time target list database 154 includes one or more dynamic target parameters of the emulated radar targets, which simulate movement of the emulated targets during testing. The target list file database 156 includes target parameters of emulated radar targets that are pre-generated in batch mode, for example, for different scenarios. The target list file database 156 may be populated in part by parameters from the real-time target list database 154. For example, the real-time target list database 154 may provide real-time updates to the target parameters of the target list file database 156. The target list file database 156 may be used to provide emulated target parameters in playback mode, as well.

The MIMO target emulator 130 may be implemented as a processing unit. In various embodiments, the processing unit may include one or more computer processors, DSPs, FPGAs, ASICs, or combinations thereof, using any combination of hardware, software, firmware, hard-wired logic circuits, or combinations thereof. The MIMO target emulator 130 may include its own processing memory (e.g., nonvolatile memory) for storing computer readable code (e.g., software, software modules) that enables performance of the various functions described herein. For example, the processing memory may store software instructions/computer readable code executable by the processing unit (e.g., computer processor) for performing some or all aspects of methods described herein, including various steps of the method described below with reference to FIG. 2. That is, execution of the instructions/computer readable code generally causes the processing unit of the MIMO target emulator 130 to generate emulated target echo signals in response to the digital radar signals received from the emulator receivers $131_1$, $131_2$ ... $131_p$, and to send the emulated target echo signals to the DUT 101. Memories (and databases) as described herein may be RAM, ROM, flash memory, EPROM, EEPROM, registers, a hard disk, a removable disk, tape, compact disk read only memory (CD-ROM), digital versatile disk (DVD), floppy disk, blu-ray disk, or USB driver, or any other form of storage medium known in the art, which are tangible and non-transitory storage media (e.g., as compared to transitory propagating signals). Memories may be volatile or non-volatile, secure and/or encrypted, unsecure and/or unencrypted, without departing from the scope of the present teachings.

For purposes of illustration, the MIMO target emulator 130 is indicated by blocks or modules that represent instructions/computer readable code for executing various discrete functions. Thus, as shown in FIG. 1, the MIMO target emulator 130 includes decoupling module 133, pre-decoupling module 134, file storage parser 135, real-time interface 136, target emulation parameter preprocessing module 137, and MIMO target emulation module 138.

The decoupling module 133 receives and decouples the transmit coupling matrix $H_{Tx}$ of the digital radar signal from one or more of the emulator receivers $131_1$, $131_2$ ... $131_p$, indicated by an inverse transmit matrix $H_{Tx}^{-1}$. That is, the transmit coupling matrix $H_{Tx}$ may be provided by all of the emulator receivers $131_1$, $131_2$ ... $131_p$ and the transmit antennas of the DUT 101. Decoupling the digital radar signal involves multiplying the digitized signals at the ADCs of the MIMO target emulator 130 by the inverse transmit matrix $H_{Tx}^{-1}$.

The pre-decoupling module 134 receives and pre-decouples the receive coupling matrix $H_{Rx}$ of the emulated target echo signals from the target emulation module 138, generated in response to the decoupled digital radar signals, indicated by an inverse receive matrix $H_{Rx}^{-1}$. Pre-decoupling refers to multiplication of the inverse receive matrix $H_{Rx}^{-1}$ and the emulated target echo signals, so that after the resulting emulated target echo signals go through the receive coupling matrix $H_{Rx}$ formed by the coupling probe antenna array 115 and the radar receive antennas, the end results are that the emulated target echo signals are not coupled together. In other words, the DUT 101 receives the exact emulated target echo signals for each of the radar receivers without the coupling effect of the receive coupling matrix $H_{Rx}$. So, the pre-decoupling enables the receive coupling matrix $H_{Rx}$ output by the coupling probe antenna array 115 to be decoupled by the radar receivers 106. The decoupling and pre-decoupling are performed in the digital domain.

The file storage parser 135 is configured to parse parameter data retrieved from the target list file database 156, and provides the parsed parameter data to the real-time interface 136. The parsing is mainly based on time parameter data of the emulated radar targets. The emulated radar targets sharing the same time will be sent to the MIMO target emulator 130 at the same time. Time differences between the emulated radar targets are maintained when the target parameters are sent to the MIMO target emulator 130. For the real-time target list database 154, the times that the target parameter data are sent to the MIMO target emulator 130 are the times that the target parameter data are generated, which times may be updated in real-time. Accordingly, parsing is not needed for the real-time target list database 154.

The real-time interface 136 is configured to interface between the target emulation module 138 and each of the real-time target list database 154 and the target list file database 156, in order to retrieve the corresponding parameter data. The sensor transmit antenna pattern and antenna spacing data and the sensor receive antenna pattern and antenna spacing data is retrieved from the antenna pattern and spacing database 152 and provided to the target emulation parameter preprocessing module 137 through a separate radar target emulator configuration interface (not shown), which is configured once at the beginning of a test operation. The target emulation parameter preprocessing module 137 preprocesses the parameter data from the real-time interface 136 and the radar target emulator configuration interface by computing the parameters used to configure the MIMO target emulation. The target parameter data may include echo delay, Doppler frequency, radar cross section, angle of departure, and angle of arrival data, for example.

The target emulation module 138 receives the target parameters, generated by the scenario simulator, from the real-time target list database 154 and/or the target list file database 156, as well as the sensor transmit and receive antenna pattern and antenna spacing data from the antenna pattern and spacing database 152. The target emulation module 138 generates the emulated target echo signals, corresponding to the emulated radar targets, responsive to the digitized radar signals, respectively, based at least in part on the corresponding target parameters. The target parameters for each of the emulated target echo signals may include, for example, the time at which the emulated target echo signal is sent out, Doppler frequency of the emulated target echo signal, roundtrip time delay for the emulated target echo signal sent out from the emulated target to one of the radar receivers 106, radar cross section (RCS) of the corresponding emulated target for given directions, angle of arrival of the emulated target echo signal with regard to the one of the radar receivers 106, and angle of departure for the radar signal on emulated target. The emulated target echo signals indicate reflection from the emulated radar targets of the radar signals transmitted by the radar transmitters 105. The target emulation module 138 is able to generate at the same time emulated target echo signals corresponding to multiple targets in response to multiple radar signals transmitted by multiple radar transmitters 105.

The target emulation module 138 determines an emulated target echo signal T corresponding to each of the emulated radar targets, and transmitted from a corresponding one of the emulator transmitters $132_1$, $132_2$ ... $132_r$ to one of the radar receivers 106 in the DUT 101. The number of emulated radar targets and corresponding emulated target echo signals is independent of the number of emulator transmitters $132_1$, $132_2$ ... $132_r$ (which may be the same as the number of radar transmitters 105). Each emulated target echo signal T is determined according to Equation (1), below:

$$T^k_{mn}(t, f, \tau, \alpha, AoA, AOD) = \quad \text{Equation (1)}$$
$$x_m(t - \tau_k) G_{Tx,m}(AoD_k) \exp\left( j2\pi(f_0 - f_k)t - \frac{2\pi m d_{Tx} \sin(AoD_k)}{\lambda} \right)$$
$$\alpha_k G_{Rx,n}(AoA_k) \exp\left( -\frac{2\pi n d_{Rx} \sin(AoA_k)}{\lambda} \right)$$

In Equation (1), m is the index number of the radar transmitter, and n is the index number of the radar receiver, and k is the index number of the emulated radar target having an input signal from the $m^{th}$ radar transmitter and an output signal to the $n^{th}$ radar receiver. The different emulated radar targets may have the same parameters, but different parameter values. By changing the parameter values, different radar targets may be emulated dynamically. For example, a location parameter $\tau_k$ of an emulated radar target may be changed to simulate movement of the emulated radar target. In other examples of parameters, movement speed may be emulated by the Doppler frequency $f_k$, and echo signal direction may be changed by $AoA_k$.

In addition, $x_m$ is the radar signal transmitted on the $m^{th}$ radar transmitter, $G_{Tx,m}$ is the complex antenna pattern of the $m^{th}$ radar transmitter, $f_0$ is the carrier frequency of the radar signal transmitted on the $m^{th}$ radar transmitter, $f_k$ is the Doppler frequency of the corresponding echo signal from emulated radar target k in response to the radar signal transmitted on the $m^{th}$ radar transmitter, $d_{Tx}$ is the spacing of the radar transmitter antenna element corresponding to the radar transmitter with respect to other radar transmitter antenna elements, $AoD_k$ is the angle of departure of the radar signal radiated to the emulated radar target k, and $\alpha_k$ is the overall gain of the physical channel to the transmitted radar signal due to the emulated radar target k. $G_{Rx,n}$ is the complex antenna pattern of the $n^{th}$ radar receiver, $d_{Rx}$ is the spacing of the radar receiver antenna element corresponding to the radar receiver with respect to other radar receiver antenna elements, and $AoA_k$ is the angle of arrival of the emulated target echo signal corresponding to (reflected from) the radar target k.

In Equation (1), it is assumed that each of the radar transmit antenna elements and the radar receive antenna elements is in a uniform linear array. It is straight forward to extend Equation (1) to two dimensional (2D) arrays by considering the 2D spacing of the antenna arrays, and considering the angle of arrival and the angle of departure in both azimuth and elevation planes.

Therefore, for example, the emulated target echo signals for the $n^{th}$ radar receiver may be determined in according to Equation (2), below:

$$T^k_n(t, f, \tau, \alpha, AoA, AOD) = \quad \text{Equation (2)}$$
$$\sum_{m=0}^{N_{Tx}-1} T^k_{mn}(t, f, \tau, \alpha, AoA, AOD) = \sum_{m=0}^{N_{Tx}-1} x_m(t - \tau_k)$$
$$G_{Tx,m}(AoD_k) \exp\left( j2\pi(f_0 - f)t - \frac{2\pi m d_{Tx} \sin(AoD_k)}{\lambda} \right)$$
$$\alpha_k G_{Rx,n}(AoA_k) \exp\left( -\frac{2\pi n d_{Rx} \sin(AoA_k)}{\lambda} \right) =$$
$$\sum_{m=0}^{N_{Tx}-1} x_m(t - \tau_k) \left( G_{Tx,m}(AoD_k) \exp\left( -\frac{2\pi m d_{Tx} \sin(AoD_k)}{\lambda} \right) - \right.$$

-continued $$\frac{2\pi n d_{Rx}\sin(AoA_k)}{\lambda}\bigg)\alpha_k G_{Rx,n}(AoA_k)\bigg)\exp(j2\pi(f_0-f)t)$$

Based on Equation (2), it can be seen that for the emulated target echo signal from the $m^{th}$ radar transmitter to the $n^{th}$ radar receiver, each emulated radar target may be implemented by some common functions, including a delay function to emulate the echo delay, a complex gain function to emulate the overall echo signal gain, and a Doppler frequency function to emulate Doppler frequency shift for the emulated target echo signal from the radar transmitters 105 to the radar receivers 106. Based on the target parameters and the antenna pattern and spacing information for the radar transmitters 105 and the radar receivers 106, all the parameters for those functions may be derived following Equation (2), and may be emulated accordingly.

Figure 2:
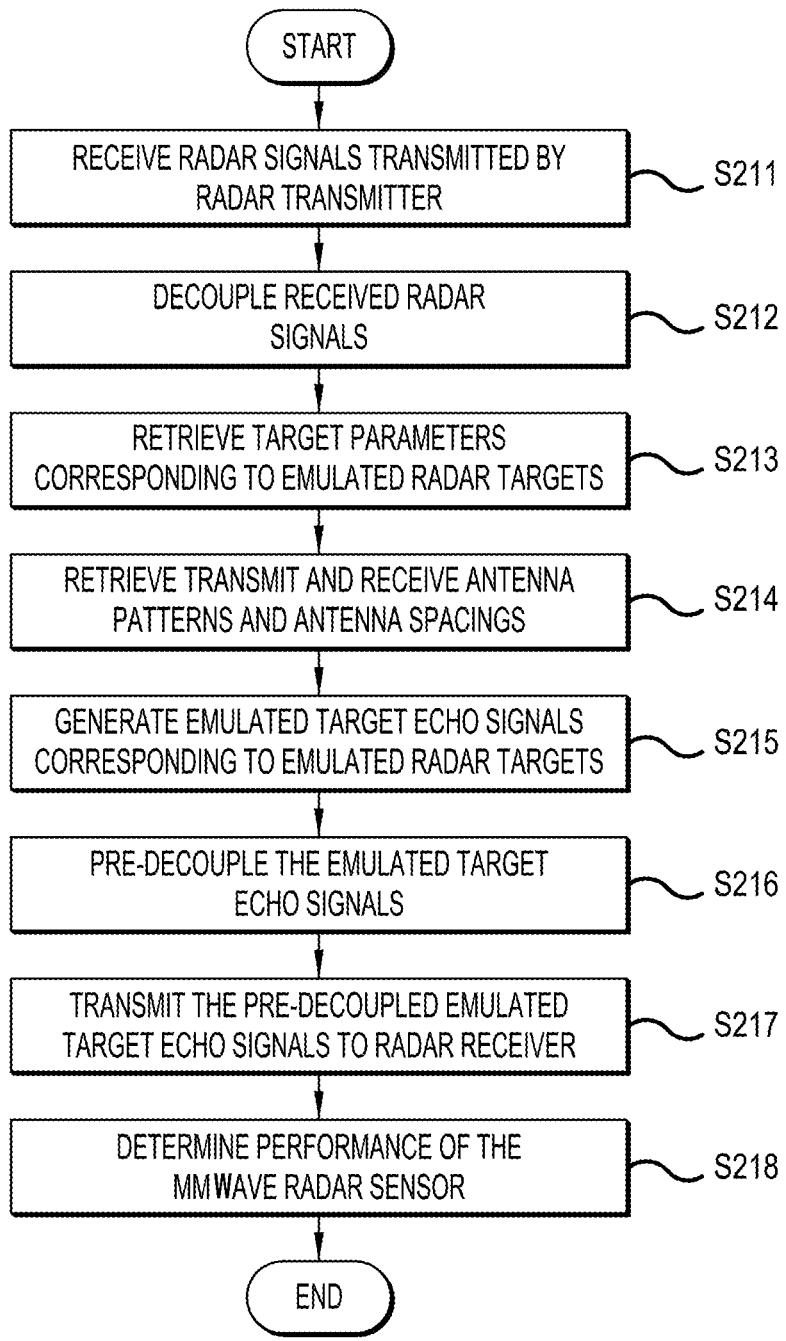
FIG. 2 is a simplified flow diagram of a method of testing a mmWave radar sensor using a MIMO radar target emulation system for dynamic echo signal emulation, according to a representative embodiment.

FIG. 2 is a simplified flow diagram of a method of testing a mmWave radar sensor (e.g., DUT) using a MIMO radar target emulation system for dynamic echo signal emulation, according to a representative embodiment.

Referring to FIG. 2, radar signals transmitted by the radar transmitters in the mmWave radar sensor (e.g., DUT 101) are received in block S211 via an antenna array of coupling probe antenna elements. The mmWave radar sensor may include the radar transmitters for transmitting the radar signals, and radar receivers for receiving emulated target echo signals from the MIMO radar target emulation system. The radar signals are received as a transmit coupling matrix $H_{Tx}$ transmitted by the radar transmitters. The received radar signals are decoupled in block S212, for example, using an inverse transmit matrix $H_{Tx}^{-1}$.

Target parameters are retrieved in block S213. For example, the target parameters may be determined by a scenario emulator, and stored in one or more databases storing a real-time target list and a file target list (e.g., real-time target list database 154, target list file database 156). The target parameters may then be retrieved from the databases. The target parameters correspond to emulated radar targets for reflecting the radar signals transmitted by the radar transmitters. In the real-time target list, the target parameters are updated continuously, and in the target list file, the target parameters are previously stored, e.g., from a dumped target list file. In block S214, transmit antenna patterns and antenna spacings corresponding to the radar transmitters, and receive antenna patterns and antenna spacings corresponding to the radar receivers are retrieved from a database. The transmit and receive antenna patterns and spacings may be determined by measuring the radar sensor's antenna patterns inside an anechoic chamber or by three-dimensional electromagnetic (EM) simulations of the mmWave radar sensor antennas, for example, and stored in one or more databases (e.g., antenna pattern and spacing database 152).

In block S215, emulated target echo signals corresponding to the emulated radar targets are generated in response to the decoupled radar signals, respectively, based at least in part on the target parameters of each of the emulated targets, the transmit antenna patterns and the receive antenna patterns. The emulated target echo signals may be generated by a DSP or other processing unit, for example, in accordance with a target echo signal algorithm, such as the algorithms indicated by Equations (1) and (2), above.

Pre-decoupling of the emulated target echo signals is performed in block S216. That is, the emulated target echo signals are pre-decoupled using an inverse receive coupling matrix $H_{Rx}^{-1}$. The pre-decoupling may include multiplication of the emulated target echo signals with the inverse receive coupling matrix $H_{Rx}^{-1}$, so that subsequent multiplication with the receive coupling matrix $H_{Rx}$, formed by the coupling probe antenna array and the radar receive antennas, will result in uncoupled emulated target echo signals at the mmWave radar sensor.

The pre-decoupled emulated target echo signals are transmitted to the radar receivers via the antenna array in block S217. The emulated target echo signals simulate echoes from the emulated targets responsive to the received radar signals, respectively. Also, emulated target echo signals may be received from multiple emulated targets in response to multiple radar signals. The performance of the mmWave radar sensor is determined in block S218, for example, using at least in part identified target lists, which are reported by the mmWave radar sensor based on the decoupled, emulated target echo signals transmitted to, and received by the radar receivers. That is, the identified target list may be compared with an emulated target list of targets being emulated, using the emulated target echo signals, to determine a number of matches between the two, indicating the number of targets and/or target echo signals being emulated. Generally, the smaller the differences between the identified target list and the emulated target list, the better the performance of the mmWave radar sensor is deemed to be. The target parameters may be reconfigurable, and may be mapped from different scenarios onto a set of common implementation parameters of the same processor function to generate the emulated echo signals corresponding to the different scenarios.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A multiple input multiple output (MIMO) target emulation system for testing a mmWave radar sensor having a plurality of radar transmitters for transmitting a plurality of radar signals, and a plurality of radar receivers for receiving a plurality of target echo signals responsive to the plurality of radar signals reflected from radar targets, the system comprising:
- an antenna array comprising a plurality of coupling probe antenna elements for receiving the plurality of radar signals transmitted by the plurality of radar transmitters and for sending emulated target echo signals to the plurality of radar receivers;
- a plurality of emulator receivers comprising down converters for down converting carrier frequencies of the plurality of radar signals received by the antenna array and analog to digital converters for digitizing the down converted radar signals, respectively, to provide digital radar signals;
- a processing unit, including a processor and a memory for storing computer readable code that, when executed by the processor, causes the processor to:
    - decouple the digital radar signals;
    - retrieve target parameters generated by a scenario simulator, the target parameters corresponding to a plurality of emulated radar targets for reflecting the plurality of radar signals transmitted by the plurality of radar transmitters;
    - generate emulated target echo signals, corresponding to the plurality of emulated radar targets, in response to the decoupled digitized radar signals, respectively, based at least in part on the target parameters of each of the plurality of emulated radar targets; and
    - pre-decouple the emulated target echo signals; and
- a plurality of emulator transmitters comprising digital to analog converters for performing digital to analog conversion of the emulated target echo signals to provide analog emulated target echo signals and up converters for up converting frequencies of the analog emulated target echo signals, respectively,
- wherein the plurality of emulator transmitters simultaneously send the analog emulated echo target signals to the mmWave radar sensor via the antenna array to simulate echoes from the plurality of emulated radar targets responsive to the plurality of radar signals, respectively, and
- wherein performance of the mmWave radar sensor is determined based at least in part on the emulated echo target signals from the plurality of emulated radar targets.

2. The system of claim 1, wherein a number of the emulator receivers is equal to a number of radar transmitters of the mmWave radar sensor; and
   wherein a number of the emulator transmitters is equal to a number of radar receivers of the mmWave radar sensor.

3. The system of claim 1, wherein the computer readable code further causes the processor to:
   retrieve transmit antenna patterns and spacing corresponding to the plurality of radar transmitters of the mmWave radar sensor, respectively; and
   retrieve receive antenna patterns and spacing corresponding to the plurality of radar receivers of the mmWave radar sensor, respectively.

4. The system of claim 3, wherein providing the emulated target echo signals, corresponding to the plurality of emulated radar targets, is further based on the transmit antenna patterns and spacing and on the receive antenna patterns and spacing.

5. The system of claim 1, wherein the plurality of radar signals transmitted by the plurality of radar transmitters are arranged in a transmit coupling matrix, and wherein decoupling the digital radar signals comprises decoupling the transmit coupling matrix using an inverse transmit coupling matrix.

6. The system of claim 5, wherein pre-decoupling the emulated target echo signals comprises multiplying the emulated target echo signals by an inverse receive coupling matrix so that subsequent multiplication by a receive coupling matrix, formed by the antenna array and radar receive antennas, result in uncoupled emulated target echo signals at the mmWave radar sensor, free of interference from other emulator transmitters of the plurality of emulator transmitters.

7. The system of claim 1, wherein the target parameters for each emulated target echo signal of the emulated target echo signals include time the emulated target echo signal is sent out, Doppler frequency of the emulated target echo signal, roundtrip time delay for the emulated target echo signal from the emulated radar target to the radar receivers, radar cross section (RCS) of the emulated radar target for given directions, angle of arrival of the emulated target echo signal with regard to the one of the radar receivers, and angle of departure for the radar signal on emulated radar target.

8. The system of claim 1, further comprising a real-time target list populated by the scenario simulator, wherein the target parameters are updated continuously in the real-time target list.

9. The system of claim 8, wherein the target parameters are reconfigurable and correspond to different scenarios, and wherein the computer readable code further causes the processor to map the target parameters from the different scenarios, retrieved from the real-time target list, onto a set of common implementation parameters of a same processor function to generate the emulated target echo signals for the different scenarios.

10. The system of claim 1, further comprising a target list file populated by the scenario simulator wherein the target parameters are stored from a dumped target list file in the target list file.

11. The system of claim 1, wherein a number of emulated radar targets and corresponding emulated target echo signals is independent of a number of emulator transmitters.

12. A method of testing a mmWave radar sensor, comprising a plurality of radar transmitters and a plurality of radar receivers, using a multiple input multiple output (MIMO) target emulation system, the method comprising:
   receiving radar signals transmitted by the plurality of radar transmitters via an antenna array comprising a plurality of coupling probe antenna elements;
   decoupling the received radar signals;
   retrieving target parameters provided by a scenario simulator, the target parameters corresponding to emulated targets for reflecting the radar signals transmitted by the plurality of radar transmitters;
   retrieving transmit antenna patterns corresponding to the plurality of radar transmitters and receive antenna patterns corresponding to the plurality of radar receivers;
   generating emulated target echo signals, corresponding to the emulated targets, in response to the decoupled radar signals, respectively, based at least in part on the target parameters of each of the emulated targets, the transmit antenna patterns and the receive antenna patterns;

pre-decoupling the emulated target echo signals; and
transmitting the pre-decoupled emulated target echo signals to the plurality of radar receivers via the antenna array to simulate echoes from the emulated targets responsive to the received radar signals, respectively,
wherein performance of the mmWave radar sensor is determined based at least in part on comparing an identified target list by the mmWave radar sensor and an emulated target list of the emulated targets using the emulated echo target signals to determine a number of matches.

13. The method of claim 12, wherein the radar signals transmitted by the plurality of radar transmitters are arranged in a transmit coupling matrix, and wherein decoupling the received radar signals comprises decoupling the transmit coupling matrix using an inverse transmit coupling matrix.

14. The method of claim 13, wherein pre-decoupling the emulated target echo signals comprises multiplying the emulated target echo signals by an inverse coupling matrix so that subsequent multiplication by a receive coupling matrix, formed by the antenna array and radar receive antennas, results in uncoupled emulated target echo signals at the mmWave radar sensor.

15. The method of claim 12, wherein the scenario simulator populates a real-time target list in which the target parameters are updated continuously.

16. The method of claim 12, wherein the scenario simulator populates a target list file in which the target parameters are previously stored from a dumped target list file.

17. The method of claim 12, further comprising:
mapping the target parameters from different scenarios onto an set of common implementation parameters of a same DSP function to generate the emulated target echo signals corresponding to the different scenarios.

18. A non-transitory computer readable medium having stored thereon software instructions for testing a mmWave radar sensor comprising a plurality of radar transmitters and a plurality of radar receivers that, when executed by a processor, cause the processor to execute steps comprising:
decoupling radar signals received from the plurality of radar transmitters via an antenna array comprising a plurality of coupling probe antenna elements;
retrieving target parameters provided by a scenario simulator, the target parameters corresponding to emulated targets for reflecting the radar signals received from by the plurality of radar transmitters;
retrieving transmit antenna patterns corresponding to the plurality of radar transmitters and receive antenna patterns corresponding to the plurality of radar receivers;
generating emulated target echo signals, corresponding to the emulated targets, in response to the decoupled radar signals, respectively, based at least in part on the target parameters of each of the emulated targets, the transmit antenna patterns and the receive antenna patterns; and
pre-decoupling the emulated target echo signals to provide pre-decoupled emulated target echo signals to be transmitted to the plurality of radar receivers via the antenna array to simulate echoes from the emulated targets responsive to the received radar signals, respectively,
wherein performance of the mmWave radar sensor is determined based at least in part on comparing an identified target list by the mmWave radar sensor and an emulated target list of the emulated targets using the emulated echo target signals.

19. The non-transitory computer readable medium of claim 18, wherein the software instructions cause the processor to execute further steps comprising:
retrieving transmit antenna patterns and spacing corresponding to the plurality of radar transmitters of the mmWave radar sensor, respectively; and
retrieving receive antenna patterns and spacing corresponding to the plurality of radar receivers of the mmWave radar sensor, respectively,
wherein generating the emulated target echo signals, corresponding to the emulated targets, is further based on the transmit antenna patterns and spacing and on the receive antenna patterns and spacing.

20. The non-transitory computer readable medium of claim 18, wherein the radar signals received from the plurality of radar transmitters are arranged in a transmit coupling matrix, and wherein decoupling the radar signals comprises decoupling the transmit coupling matrix using an inverse transmit coupling matrix, and
wherein pre-decoupling the emulated target echo signals comprises multiplying the emulated target echo signals by an inverse receive coupling matrix.

\* \* \* \* \*

UNITED STATES PATENT AND TRADEMARK OFFICE
CERTIFICATE OF CORRECTION

| | |
|---|---|
| PATENT NO. | : 11,486,963 B2 |
| APPLICATION NO. | : 16/944277 |
| DATED | : November 1, 2022 |
| INVENTOR(S) | : Hong-Wei Kong |

It is certified that error appears in the above-identified patent and that said Letters Patent is hereby corrected as shown below:

On the Title Page

Below item (65), "Prior Publication Data", in Column 1, Line 2, insert:
-- (30) Foreign Application Priority Data
Aug. 20, 2019 (CN) ......................... 201910769553.6 --, as a new field entry.

Signed and Sealed this
Third Day of January, 2023

Katherine Kelly Vidal
*Director of the United States Patent and Trademark Office*